United States Patent [19]
Cox

[11] Patent Number: 5,813,473
[45] Date of Patent: Sep. 29, 1998

[54] ADJUSTABLE FLIP-UP DISK MOUNTAIN ASSEMBLY

[75] Inventor: Philip David Cox, Polk City, Iowa

[73] Assignee: Deere & Company, Moline, Ill.

[21] Appl. No.: 853,081

[22] Filed: May 8, 1997

[51] Int. Cl.⁶ ..................................................... A01B 23/02
[52] U.S. Cl. .......................... 172/662; 172/683; 172/740
[58] Field of Search .................................... 172/683, 662, 172/739, 740, 734

[56] References Cited

U.S. PATENT DOCUMENTS

| | | | |
|---|---|---|---|
| 2,998,852 | 9/1961 | Hall | 172/683 X |
| 4,738,316 | 4/1988 | Wood | 172/603 |
| 5,531,276 | 7/1996 | Noonan et al. | 172/662 |

Primary Examiner—Michael J. Carone
Assistant Examiner—Christopher J. Novosad

[57] ABSTRACT

A disk support bracket assembly including a cross tube bracket and a disk shank support bracket pivotally connected to the cross tube bracket to allow the disk support bracket to pivot between a working position wherein the bracket bottoms against the cross tube bracket, and a storage position wherein the bracket is offset vertically from the cross tube to increase clearance. The shank support bracket is pivotally connected to the cross tube bracket near an upper forward corner of the cross tube and includes a relatively wide stop portion that bottoms against a mating stop portion at the front face of the tube bracket when the shank support bracket is in the working position. A pin is selectively insertable through apertures in the brackets adjacent the stop to lock the shank in an upright working position. As the disk is operated in the forward direction, the load on the disk supporting shank urges the stop portions together to bear substantially all the shank loads in the stop area so that forces on the pin and pin wear are reduced over that encountered by a normal load-bearing pin.

20 Claims, 4 Drawing Sheets

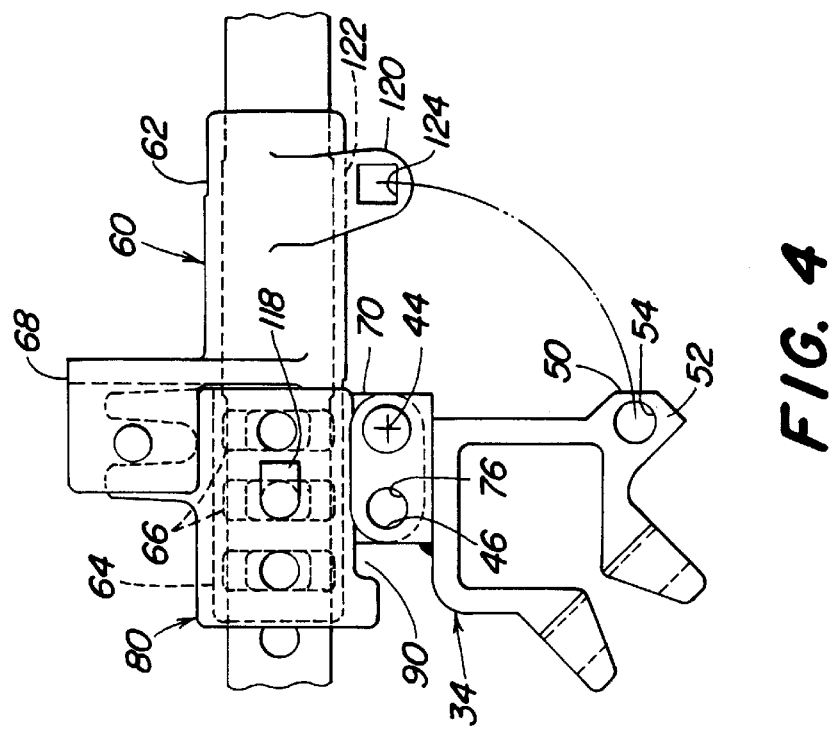
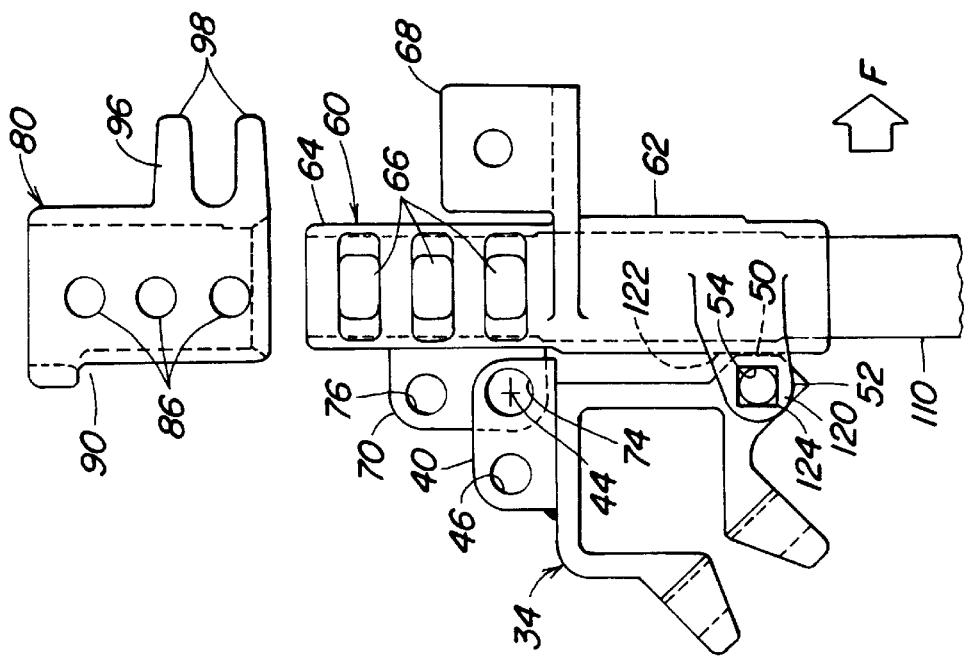

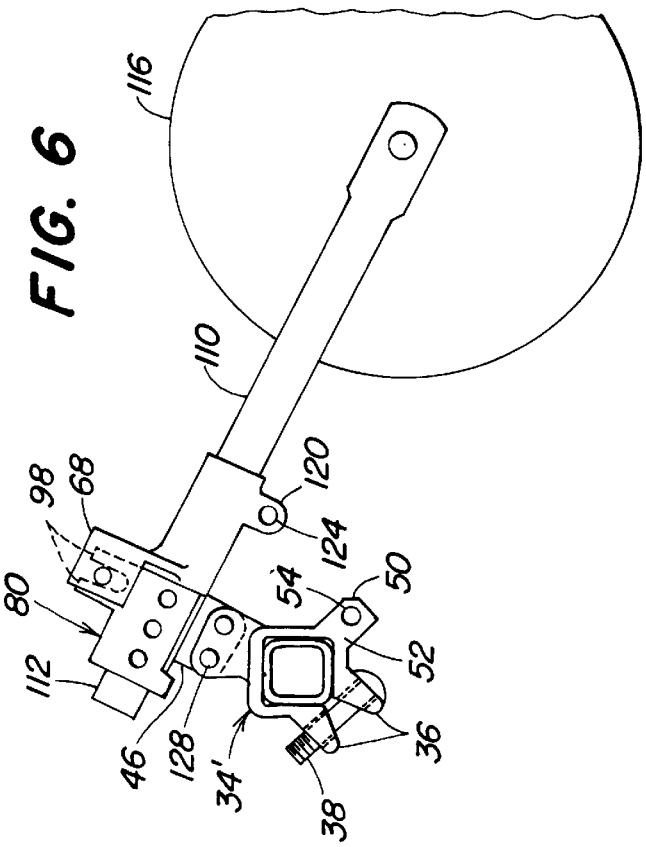
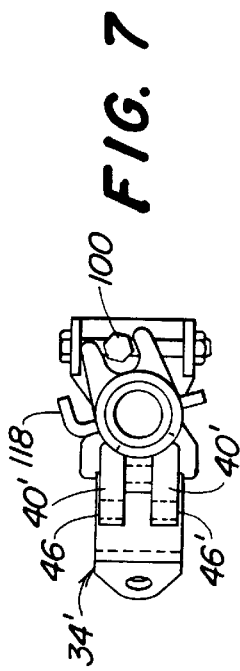
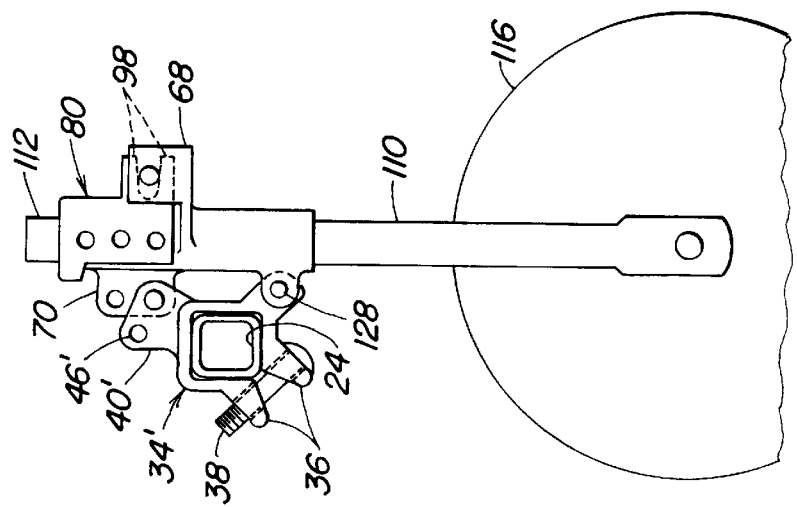

ADJUSTABLE FLIP-UP DISK MOUNTAIN ASSEMBLY

BACKGROUND OF THE INVENTION

1. Field of the Invention

The present invention relates generally to agricultural implements and, more specifically, to an adjustable tool mounting arrangement which facilitates tool storage.

2. Related Art

Row crop cultivators such as the commercially available John Deere model 886 Row Crop Cultivator often include barring-off disks which are adjustable for depth, cutting band width and disk yaw angle. U.S. Pat. No. 4,738,316 assigned to Deere & Company shows an adjustment structure for making vertical and angular adjustments to a shank-mounted disk.

When repairing or performing maintenance on a cultivator with barring-off disks, or when operating the cultivator where the disks are unnecessary, the operator must move the disks from the normal operating position by completely removing the shanks with the disks from the cultivator or inverting the shank relative to the shank bracket. Another arrangement requires that the shank be pinned in the highest position for storage. Other assemblies include a tube within a tube, and the shank is moved to a storage position by rotating one tube relative to the other. Removing the disks usually requires component disassembly which is time-consuming and can result in lost components. Heretofore, incorporating convenient disk storage into a disk assembly design that is user-friendly and yet provides full disk adjustment has been a problem. Previously available assemblies providing storage capabilities, such as those with a tube within another tube, have often been hard to adjust, particularly after the assemblies are subjected to the hostile agricultural environment and become rusty and corroded. Some suggested or available designs, such as those wherein the shank is pinned in the highest position, often fail to provide adequate clearance in the storage position, and others subject a pin or other securing device to the heavy shank loading during field operations which results in wear and looseness in the assembly.

BRIEF SUMMARY OF THE INVENTION

It is therefore an object of the present invention to provide an improved disk mounting assembly for a cultivator. It is a further object to provide such an assembly which overcomes most or all of the aforementioned problems.

It is a further object of the present invention to provide an improved disk mounting assembly for a cultivator which has a storage or maintenance position. It is another object to provide such an assembly which can be moved to the storage position without need to remove the assembly from the cultivator. It is a further object to provide such an assembly which is easy to adjust in either the storage or the working position. It is still another objected to provide such an assembly which provides improved crop clearance in the storage position when compared to at least most previously available mounting assemblies.

It is still another object of the present invention to provide an improved disk mounting assembly for a cultivator which is sturdier, more stable and less subject to wear than at least some most previously available mounting assemblies. It is another object to provide such an assembly which is easily adjusted and which includes a storage position.

It is a further object to provide an improved disk mounting assembly having a pivoting shank support which is positioned above the toolbar support tube or cross tube in the storage position and which is stopped adjacent the tube in a working position. It is another object to provide such an assembly having pin structure for selectively securing the shank support in either the storage or the working position, wherein the pin does not have to bear heavy shank loading when the support is in the working position so that pin wear is reduced.

A disk mounting constructed in accordance with the teachings of the present invention includes a disk support bracket assembly having depth and yaw angle adjustability. The bracket assembly includes a cross tube bracket, and a disk shank support bracket pivotally connected to the tube bracket to allow the disk support bracket to pivot between a working position wherein the bracket bottoms against the cross tube bracket and a storage position wherein the bracket is offset vertically from the cross tube to increase clearance. Preferably, the shank support bracket is pivotally connected to the cross tube bracket near an upper forward corner of the cross tube and includes a relatively wide stop portion that bottoms against the front face of the tube bracket when the shank support bracket is in the working position. A pin is selectively insertable through apertures and a bore in the brackets adjacent the stop to lock the shank in an upright working position. As the disk is operated in the forward direction, the load on the disk supporting shank urges the stop portion against the tube bracket face, and the stop portion bears substantially all the shank loads in the area of the stop so that forces on the pin and pin wear are reduced compared to a conventional load-bearing pin arrangement.

To move the shank to a storage position, the operator simply removes the pin from the apertures and bore adjacent the stop portion and rotates the shank support bracket upwardly about the bracket pivot until the upper portion of the shank is located above the cross tube. The same pin then is inserted through mating apertures in the shank support bracket and the cross tube bracket to secure the assembly in the storage position wherein the shank is generally horizontally disposed with the depth and yaw angle adjusting portion directly above the cross tube.

The bracket assembly is relatively simple and yet is very sturdy and easy to adjust and move between the working and storage positions. Removal of disk components is unnecessary. In the storage position, the bracket assembly assures optimum under tube clearance and easy access to the implement components. Full yaw and depth adjustability is maintained at easily accessed locations in either the storage or the working position. A special yaw adjusting cap having a pivot accommodating cut-away helps provide a compact assembly with full yaw adjustability.

These and other objects, features and advantages of the present invention will become apparent to one skilled in the art upon reading the following detailed description in view of the drawings.

BRIEF DESCRIPTION OF THE DRAWINGS

FIG. 3 is an enlarged view of the connector and shank mounting bracket of FIG. 1 with the yaw adjusting collar removed to better show the details of the collar.

FIG. 4 is an enlarged view similar to FIG. 3 but showing the shank mounting bracket rotated to the storage position.

FIG. 5 is a side view of another embodiment of the adjustable barring-off assembly shown in the working position.

FIG. 6 is a view similar to FIG. 5 but showing the assembly in the storage position.

FIG. 7 is a top view of a portion of the assembly of FIG. 5.

DETAILED DESCRIPTION OF THE DRAWINGS

Figure 1:
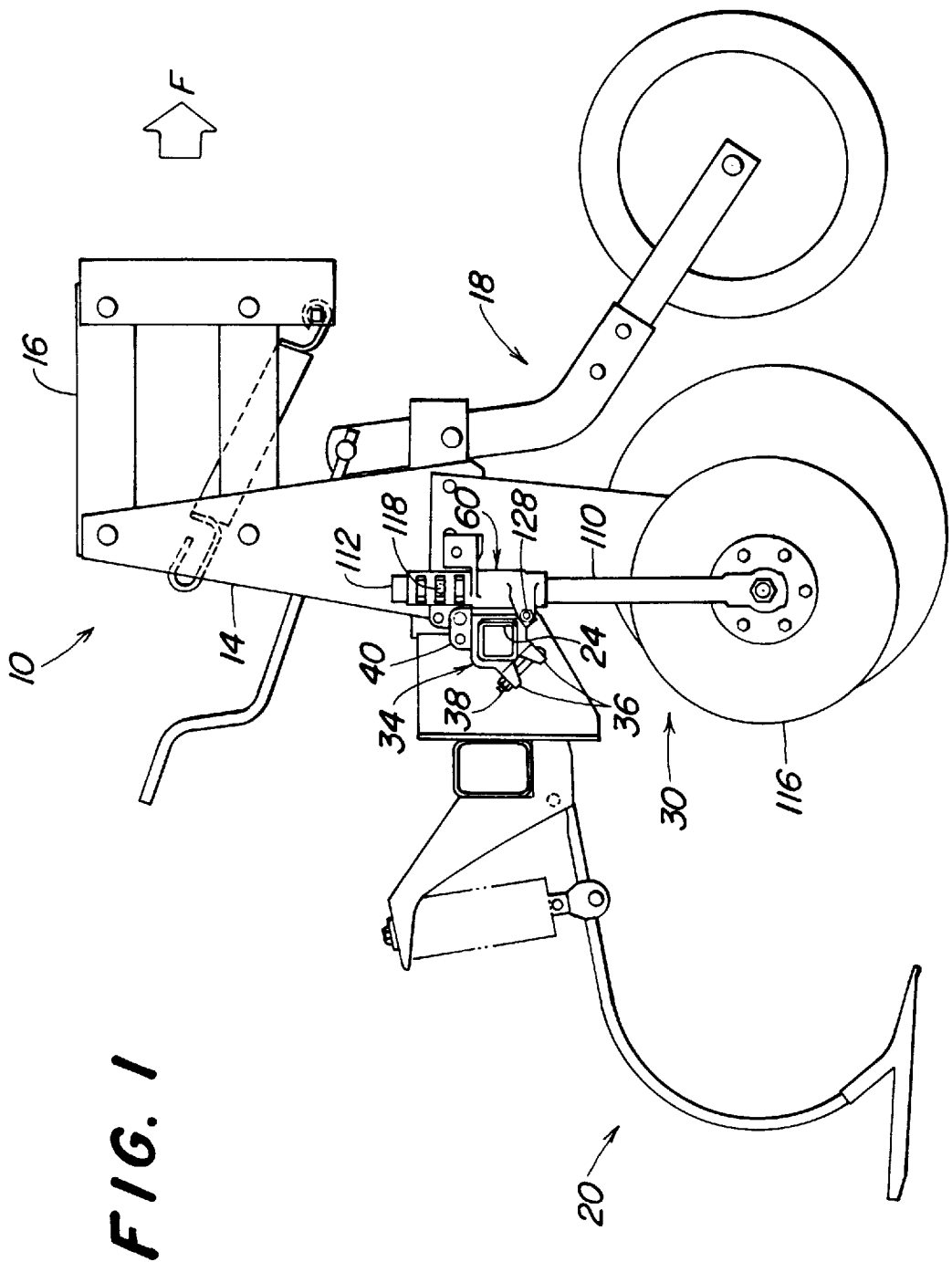
FIG. 1 is a side view of a cultivator rig with an adjustable barring-off disk assembly shown in the working position.

Referring now to FIG. 1, therein is shown a cultivator rig 10 supported from a toolbar (not shown) for forward movement (F) over the ground. The rig 10 includes an upright tool support 14 connected by a four-bar linkage 16 to the toolbar and an adjustable depth gauging wheel assembly 18 connected to the support 14. Conventional earthworking tools such as shown at 20 are carried by the tool support 14 for operating in the soil at a depth dependent on the adjustment of the gauging wheel assembly 18.

Figure 2:
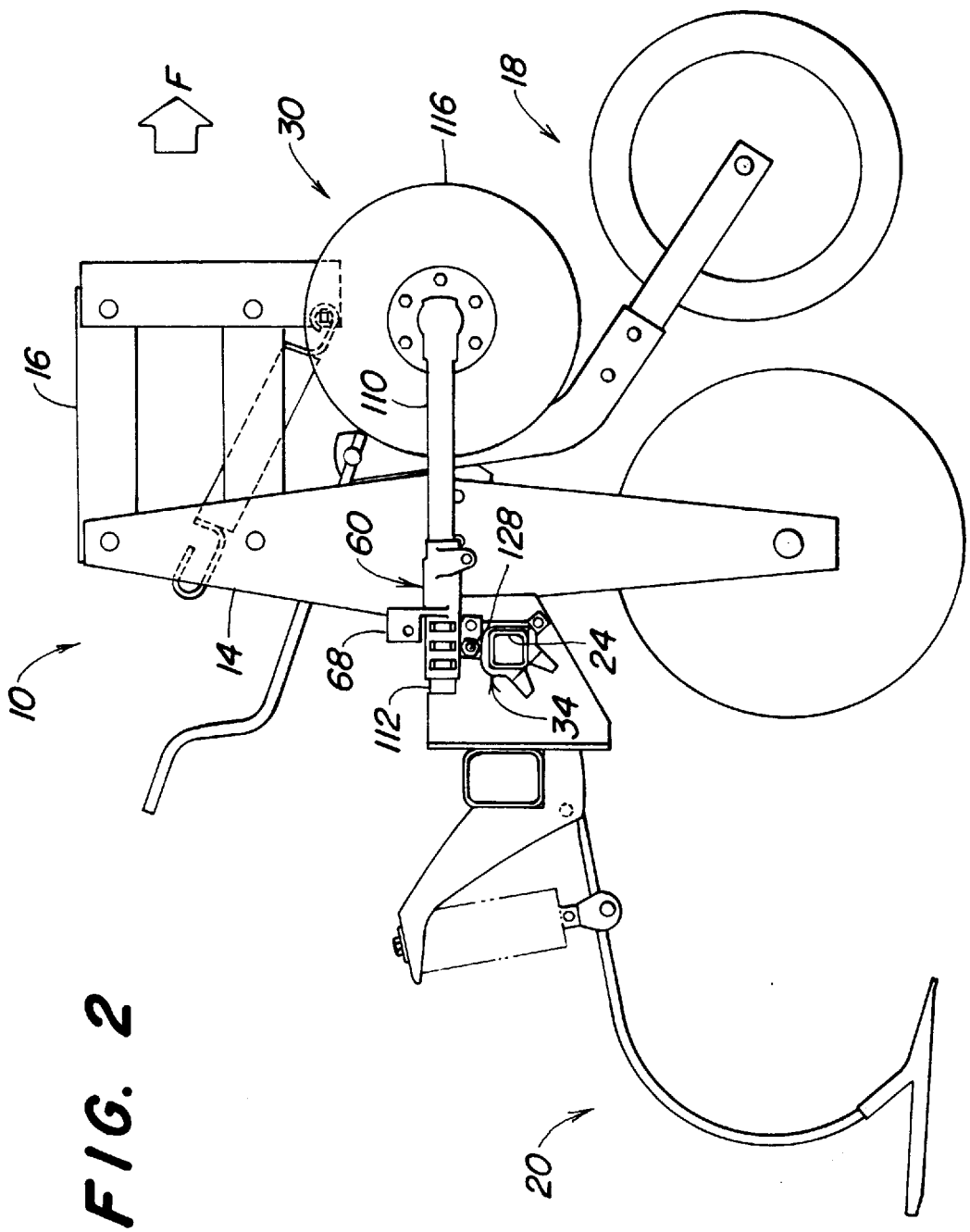
FIG. 2 is a view similar to FIG. 1 but showing the barring-off disk assembly pivoted upwardly to a storage position.

A cross support or tube 24 is mounted on the support 14 and extends outwardly therefrom. A barring-off disk assembly 30 or similar tool assembly is connected to the tube 24 and is movable between a lowered working position (FIG. 1) and a raised storage position (FIG. 2). The assembly 30 includes a tube connector 34 slidably received on and conforming generally to the shape of the tube 24 for transverse adjustment thereon. Apertured projections 36 located near the lower rear portion of the connector 34 receive a mounting bolt 38 which clamps the connector 34 tightly against the tube faces at the desired transverse location along the tube 24. Transversely spaced planar ears 40 project upwardly from the upper forward corner of the connector 34 and include forward apertures 44 (FIG. 3) defining a pivot axis, and aft apertures 46. A transverse stop pad 50 with a planar sides 52 and a transverse bore 54 projects forwardly and downwardly at the lower forward corner of the tube connector 34 a substantial distance below the pivot axis (FIG. 4) directly below the forward apertures 44 in the upper ears 40.

A shank bracket 60 is pivotally connected to the ears 40 at 44 for pivoting between the working position (FIG. 3) and the storage position (FIG. 4). The bracket 60 includes an elongated shank-receiving member 62 having an upper portion 64 with vertically spaced opposed side slots 66 which are horizontally disposed when the bracket is in the working position. An adjustment support 68 projects forwardly (FIG. 3) from a location near the center of the member 62, and a rearwardly projecting upright mounting tang 70 is fixed to the aft side of the bracket 60 opposite the support 68. The tang 70 includes a lower aperture 74 and is pinned between the ears 40 by a pivot extending through the apertures 44 and 74 for rocking about the pivot axis. The tang 70 is also apertured at a location 76 offset from the lower aperture 74. The location 76 aligns with the aft apertures 46 in the in the ears 40 so that a securing pin may be inserted through the apertures to selectively maintain the bracket 60 in the storage position (FIGS. 2 and 4).

A shank adjusting collar 80 (FIG. 3) is journalled over the upper portion 64 of the shank bracket 60 adjacent the tang 70 and includes side apertures 86 which align with the slots 66 in the upper portion 64 of the bracket 60. The lower aft section of the collar 80 opens rearwardly at 90 so that the collar can be slid down around the pivot area for a compact arrangement while still providing for rotation of the bracket 60 over a limited range of angles. Fork structure 96 with horizontally and vertically bifurcated forward projections 98 is received between the sides of the bracket 68. A screw thread angle adjusting member 100 (see FIG. 7) rotates the collar 80 to the desired angular position. The adjusting structure for the collar 80 is similar to that shown and described in the aforementioned U.S. Pat. No. 4,738,316.

The barring-off disk assembly 30 also includes a shank 110 having a cylindrically shaped upper end 112 rotatably received within the shank bracket 60. The lower end of the shank 110 rotatably mounts a barring-off disk 116 or similar soil working tool. The upper shank end 112 is apertured, and one of the shank apertures is aligned with one set of the collar apertures 86 and shank bracket slots 66 depending on the desired working height setting of the tool 116. A pin 118 is inserted through the shank aperture, slots 66 and collar apertures 86 to retain the shank 110 at the adjusted height setting and to constrain the shank for rotation with the collar 80. Thereafter, the adjusting member 100 can be threaded to the left or the right to change the working angle of the tool 116. If further details of the shank angle and height adjustment structure are desired, reference may be had to the aforementioned U.S. Pat. No. 4,738,316.

The lower portion of the shank-receiving member 62 includes transversely spaced, rearwardly projecting ears 120 which embrace the planar sides 52 of the stop pad 50 when the bracket 60 is in the working position (FIG. 3). A pad portion 122 extending transversely between the ears 120 bottoms solidly against the pad 50 as the bracket 60 is rocked from the storage position into the working position. An aperture 124 in each of the ears 120 is centered with respect to the bore 54 in the pad 50 to receive a securing pin 128 which prevents the bracket 60 from rocking away from the working position. The shank loads are transferred substantially through the pad 50 and mating pad portion 122 at the pin area to reduce loads and wear on the pin. The pad 50 and mating pad portion 122 are relatively wide and have a dimension on the order of the diameter of the shank-receiving member 62 to provide a wide stance for good stability and load transfer characteristics. As the rig 10 is operated in the field with the disk assembly 30 in the working position of FIGS. 1 or 5, the bracket 60 is urged in the clockwise direction by the soil forces acting against the tool 116 so that the bracket 60 bottoms against the connector 34.

As shown in FIGS. 1–4, the bracket 60 pivots approximately 90 degrees about the axis of the aperture 44 from the working position wherein the shank 110 is upright to the storage position wherein the shank assumes a horizontal position with the bracket 60 and adjusting structure located directly above the cross tube 24. In the embodiment shown in FIGS. 5–7 wherein components corresponding to but having a slightly different configuration than those in the embodiment of FIGS. 1–4 are indicated with prime, the shank 110 is angled downwardly and forwardly in the storage position so that the axis of rotation of the disk 116 is slightly below the level of the bracket 34 and the top of the disk is slightly below the top of the bracket 60. In either embodiment, the single pin 128 may be used to secure the bracket 60 in either the working position or the storage position. In the storage position, the disk assembly 30 is located to provide maximum under frame clearance without interfering with rig operation. Yaw and shank height adjustments can be made easily in either the working position or the storage position.

Having described the preferred embodiment, it will become apparent that various modifications can be made without departing from the scope of the invention as defined in the accompanying claims.

I claim:

1. A mounting assembly for supporting a shank from a cross tube, the shank having a ground-working tool connected thereto for movement in soil in a forward direction, the mounting assembly comprising:

a connector adapted for mounting on the cross tube;

a bracket member including a pivot connected to the connector for pivoting of the bracket member relative to the cross tube about a pivot axis transverse to the forward direction in a first angular direction towards a working position and an opposite angular direction towards a storage position, the bracket member also including a shank-receiving portion supporting the shank relative to the cross tube;

a stop offset vertically from the pivot, the stop bottoming adjacent the cross tube and preventing pivoting of the bracket member beyond the working position as the bracket member is pivoted from the storage position to the working position; and wherein movement of the tool in the forward direction through the soil urges the shank and bracket member in the first angular direction with the stop bottoming relative to the cross tube so that shank loads adjacent the stop are transferred to the cross tube through the stop.

2. The mounting assembly as set forth in claim 1 further including pin structure selectively insertable through the connector and bracket member to prevent rotation of the bracket member in the opposite direction away from the working position, wherein the shank loads are carried in the area of the pin structure substantially by the stop to thereby reduce forces on the pin.

3. The mounting assembly as set forth in claim 2 wherein the pin structure is located adjacent the stop.

4. The mounting assembly as set forth in claim 1 wherein the pivot is located forwardly and above the cross tube so that the bracket member pivots downwardly and is biased rearwardly against the connector as the tool is moved forwardly in the soil.

5. The mounting assembly as set forth in claim 4 wherein the shank-receiving portion includes a shank angle adjustment pivotable with the bracket member.

6. The mounting assembly as set forth in claim 5 wherein the shank angle adjustment is offset above the cross tube and pivots with the bracket member to a location above the cross tube when the bracket member is in the storage position.

7. The mounting assembly as set forth in claim 6 including a storage pin selectively insertable through an aperture in the bracket member at a location above the cross tube when the bracket member is in the storage position for retaining the bracket member in the storage position.

8. The mounting assembly as set forth in claim 1 wherein the bracket member is rotatable approximately 90 degrees from an upright position corresponding to the working position to a position approaching horizontal.

9. The mounting assembly as set forth in claim 8 wherein the pivot is located forwardly and above the cross tube so that the bracket member is urged downwardly and rearwardly as the tool is moved forwardly in the soil.

10. The mounting assembly as set forth in claim 1 wherein the shank is located forwardly of the cross tube when the bracket member is in the working position, and the shank is substantially above the cross tube in a horizontal attitude when the bracket member is in the storage position to thereby provide clearance under the cross tube.

11. A mounting assembly for supporting a shank from a cross tube, the shank having a ground-working tool connected thereto for movement in soil in a forward direction, the mounting assembly comprising:

a connector adapted for mounting on the cross tube;

a bracket member including a pivot connected to the connector for pivoting of the bracket member relative to the cross tube about a pivot axis transverse to the forward direction in a first angular direction towards a working position and an opposite angular direction towards a storage position;

a stop offset vertically from the pivot and preventing pivoting of the bracket member beyond the working position as the bracket member is pivoted from the storage position to the working position;

wherein the bracket member includes a shank-receiving portion adjustably supporting the shank relative to the cross tube; and a shank adjustment including a portion pivotable with the bracket member.

12. The mounting assembly set forth in claim 11 wherein movement of the tool in the forward direction through the soil urges the shank and bracket member in the first angular direction with the stop bottoming relative to the cross tube so that shank loads adjacent the stop are transferred to the cross tube through the stop.

13. The mounting assembly as set forth in claim 11 wherein the shank adjustment comprises a yaw angle adjustment.

14. The mounting assembly as set forth in claim 13 wherein the yaw angle adjustment includes a cap member that is rotatable on the shank-receiving portion, and has a pivot-accommodating opening, the opening facilitating rotation of the cap member relative to the pivot.

15. A mounting assembly for adjustably supporting an upright implement shank from a cross support for forward movement over the ground, the mounting assembly comprising:

a bracket connectable to the cross support and having a transverse bracket pivot;

a shank support connected to the bracket pivot for pivoting about an axis between a working position and a storage position, the shank support including a journal area adjustably receiving an upper portion of the implement shank adjacent the pivot;

a shank adjusting member connected to the shank support adjacent the pivot and pivotable with the shank support;

wherein the shank is offset in the fore-and-aft direction from the cross support when the shank support is in the working position and is offset vertically from the cross support when the shank support is in the storage position.

16. The mounting assembly as set forth in claim 15 wherein the pivot is located generally forwardly and above the cross support and the shank is located forwardly of the cross support when the shank support is in the working position.

17. The mounting assembly as set forth in claim 16 wherein the shank support, in the working position, contacts the bracket at a location offset vertically from the pivot so that loading on the shank is transferred to the cross tube at the location.

18. The mounting assembly as set forth in claim 17 wherein the assembly includes pin structure selectively insertable through a first set of apertures in the bracket for preventing pivoting of the shank support away from the working position, wherein a substantial portion of the loading on the shank in carried directly by the shank support and bracket independently of the pin structure.

19. The mounting assembly as set forth in claim 18 wherein the bracket include a second set of apertures and the pin structure is selectively insertable through the second set of apertures when the shank support is in the storage position.

20. The mounting assembly as set forth in claim 15 wherein the shank adjusting member includes a cylindrical cap having a cut-away portion received over the bracket pivot, the cut-away portion facilitating rotation of the cap member relative to the pivot.

* * * * *